(12) United States Patent
Kay et al.

(10) Patent No.: US 10,691,278 B1
(45) Date of Patent: Jun. 23, 2020

(54) REDUCED LINE COUNT TOUCH PANEL FOR MUTUAL CAPACITANCE MEASUREMENTS

(71) Applicant: Sharp Kabushiki Kaisha, Osaka (JP)

(72) Inventors: Andrew Kay, Oxford (GB); Diego Gallardo, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 16/244,457

(22) Filed: Jan. 10, 2019

(51) Int. Cl.
  *G06F 3/044* (2006.01)
  *G06F 3/047* (2006.01)

(52) U.S. Cl.
  CPC ............ *G06F 3/0445* (2019.05); *G06F 3/044* (2013.01); *G06F 3/047* (2013.01); *G06F 3/0446* (2019.05); *G06F 3/0448* (2019.05)

(58) Field of Classification Search
  CPC ........ G06F 3/044; G06F 3/0445; G06F 3/047; G06F 3/0448; G06F 3/0446
  See application file for complete search history.

(56) References Cited

U.S. PATENT DOCUMENTS

| | | | |
|---|---|---|---|
| 9,105,255 B2 | 8/2015 | Brown et al. | |
| 9,634,660 B2 * | 4/2017 | Trend | G06F 3/044 |
| 9,965,089 B2 * | 5/2018 | Zhang | G06F 3/044 |
| 2013/0234739 A1 * | 9/2013 | Deng | G06F 3/044 |
| | | | 324/686 |
| 2014/0009428 A1 * | 1/2014 | Coulson | G06F 3/044 |
| | | | 345/174 |
| 2014/0184939 A1 * | 7/2014 | Lai | G06F 3/044 |
| | | | 349/12 |
| 2015/0179122 A1 * | 6/2015 | Brown | G06F 3/0416 |
| | | | 345/174 |
| 2015/0205405 A1 * | 7/2015 | Yumoto | G06F 3/044 |
| | | | 345/174 |
| 2016/0306456 A1 * | 10/2016 | Slamkul | G06F 3/0418 |

* cited by examiner

*Primary Examiner* — Darlene M Ritchie
(74) *Attorney, Agent, or Firm* — Renner, Otto, Boisselle & Sklar LLP

(57) ABSTRACT

A capacitive touch panel that improves detection of non-conductive objects includes a substrate; a first drive line; a first and second sense line disposed on the substrate; a first plurality of electrode elements, each electrode element of the first plurality of electrode elements is coupled to the first drive line, and the first plurality of electrode elements includes a first drive element; a second plurality of electrode elements, each electrode element of the second plurality of electrode elements is coupled to the first sense line, and the second plurality of electrode elements includes a first sense element disposed adjacent to the drive element; and a third plurality of electrode, each electrode element of the third plurality of electrode elements is coupled to the second sense line, and the third plurality of sensor elements includes a second sense element disposed in a nearest neighbor position relative to the first drive element.

12 Claims, 7 Drawing Sheets

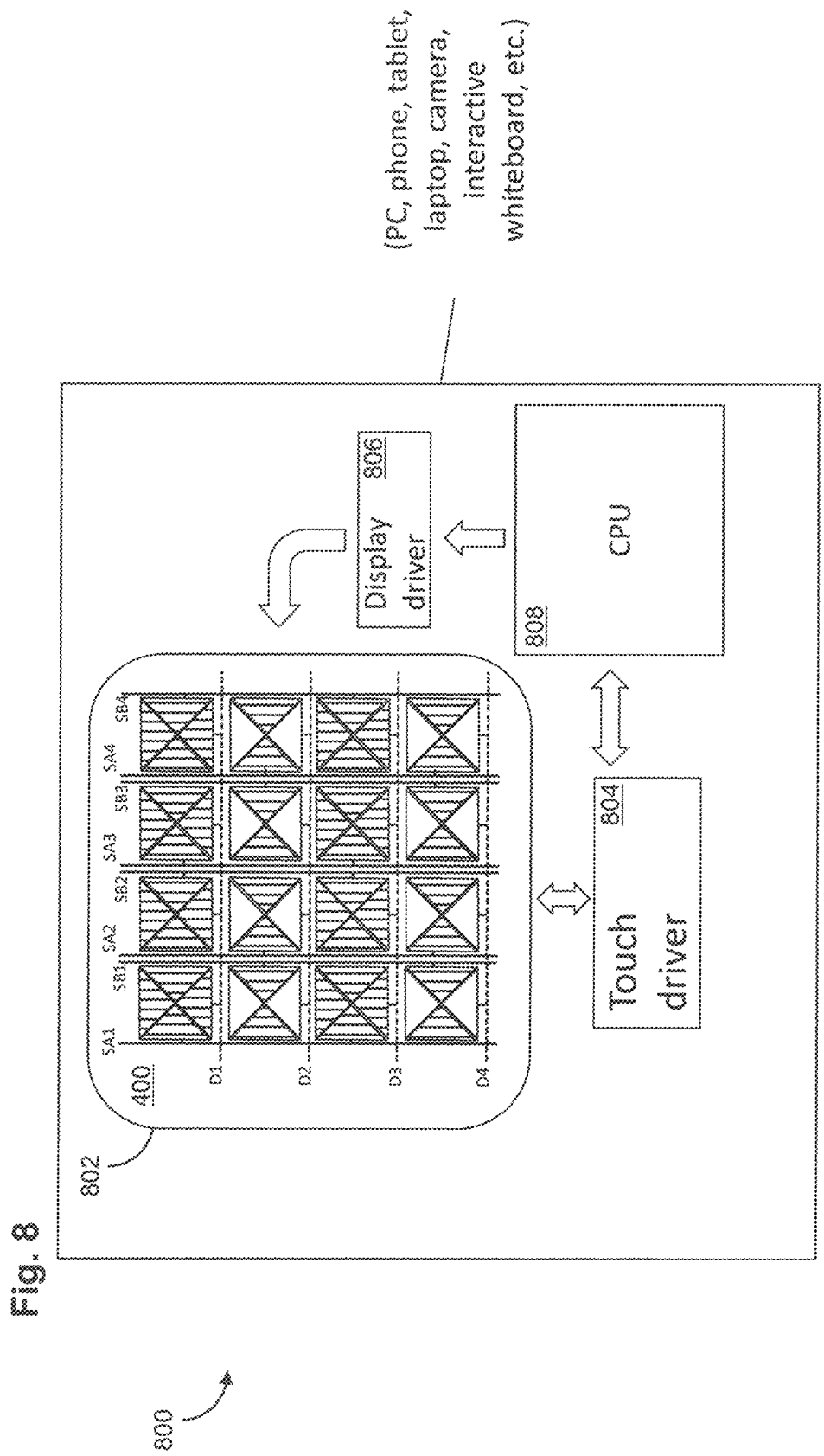

REDUCED LINE COUNT TOUCH PANEL FOR MUTUAL CAPACITANCE MEASUREMENTS

TECHNICAL FIELD

The present invention relates to capacitive touch panels and, more particularly, to a capacitive touch panel with a reduced line count that is capable of detecting input from conductive, non-conductive, and insulating objects.

BACKGROUND ART

Touch panels have become ubiquitous in portable computing and industrial applications. Capacitive touch systems have been developed to detect inputs with little or no activation force. A typical implementation of a conventional capacitance type touch panel is illustrated in FIG. 1. The touch panel 100 includes a drive electrode 102 and a sense electrode 104, across which a capacitance 106 occurs between the two electrodes. The drive electrode 102 and the sense electrode 104 may be formed on a transparent substrate such as the viewing surface of a display screen or a non-transparent surface such as an interactive whiteboard. An electrical signal may be sent to the drive electrode 102 and a response signal may be detected on the sense electrode 104. Touch panel 100 may be coupled to circuitry configured to provide the electrical signal and measure the response signal. The circuitry may be configured to determine the capacitance 106 between the two electrodes based on the response signal. A finger 108 or other input instrument (e.g. a stylus) in proximity to the electrodes may cause a large drop in the capacitance 106 and change the response signal that can be detected by the circuitry. For example, if an input object such as the finger 108 is connected to ground, as is the case for example of a human finger connected to a human body, the effect is a reduction of the amount of capacitive coupling in between the drive electrode 102 and the sense electrode 104, and hence a reduction in the magnitude of the signal measured by the circuitry attached to the sense electrode 104.

FIG. 2 is a schematic drawing depicting a touch panel configured to detect non-conductive objects. A non-conductive object causes sense electrodes positioned at near coupling distances relative to drive electrodes to have reduced capacitance, and sense electrodes with increased coupling distances to have increased capacitance. The effect depends on the precise geometry of the electrodes. If the sense electrodes are joined, these effects tend to cancel out. To detect non-conductive objects, the touch panel includes the drive electrode 102, a first sense electrode 110, and a second sense electrode 112. A voltage stimulus may be applied to the drive electrode 102, and the voltage stimulus causes a potential difference between the first sense electrode 110 and the second sense electrode 112. A first mutual capacitance, $C_A$, forms over a first coupling distance, $w_1$, and a second mutual capacitance, $C_B$, forms over a second coupling distance, $w_2$. A non-conductive input object, such as a gloved finger 109, may be detected using a first change in capacitance, $\Delta C_A$ associated with the first sense electrode 110, and a second change in capacitance $\Delta C_B$ associated with the second sense electrode 112. For a non-conductive object, the first change in capacitance may be negative and the second change in capacitance may be positive. Circuitry coupled to the electrodes may determine an impedance to ground, which tends to be about 1 GOhm or less at the operating frequency of the touch panel as associated with a conductive object, and an impedance to ground greater than about 1 GOhm as associated with a non-conductive object.

FIG. 3 shows a plan view of an electrode arrangement 301 of a conventional capacitive touch panel. For illustrative purposes, a 2×2 electrode array is shown, although any suitable number of rows "M" and columns "N" may be employed as is suitable for any particular application.

The conventional capacitive touch panel 301 includes a first sense electrode column 300, a second sense electrode column 302, a first drive electrode row 304 and a second drive electrode row 306. To detect non-conductive objects, the sense electrode columns include a first and second dual-function sense electrode and the drive electrode rows are formed by a first and second dual-function drive electrode. The first sense electrode column 300 includes a first dual function sense electrode A1 coupled to the circuitry using signal wire 310, and a second dual function sense electrode B1 coupled to the circuitry using signal wire 320. The first sense electrode A1 is adjacent to a first drive electrode D1 that is coupled to the circuitry using signal wire 330. The second sense electrode B1 is adjacent to a second drive electrode D2 that is coupled to the circuitry using signal wire 335. Each sense electrode is in a "bow-tie" configuration coupled, for example, by a conductive line 332 that extends between the two halves of the bow-tie shape. Each drive electrode similarly is in an "hourglass" configuration and coupled, for example, by a second conductive line 334 that extends between the two halves of the hourglass shape.

Comparably, the second sense electrode column 302 includes a first dual function sense electrode A2 coupled to the circuitry using signal wire 315 and a second dual function sense electrode B2 coupled to the circuitry using signal wire 325. The first sense electrode A2 is adjacent to a third drive electrode D3 that is coupled to the circuitry using signal wire 340, and the second sense electrode B2 is adjacent to a fourth drive electrode D4 that is coupled to the circuitry using signal wire 345. Here, there are two drive electrode signal wires for each row of drive electrodes, M, and two signal wires for each column of sense electrodes, N. The arrangement is symmetric in the sense that all elements in the same row have the same sense electrode (bow tie elements), and all elements in the same column have the same drive electrode (hourglass elements). Each row and column further are connected with two signal lines. With such configuration, the total number of signal wires may be determined using the total number of rows, M, and columns, N:

Total Signal Wires=2$M$+2$N$.

To illustrate, the number of rows, M, and columns, N, in a capacitive touch panel for a laptop screen may be approximately 50-70. For instance, a laptop with 60 drive electrode rows, (M=60) and 60 sense electrode rows (N=60) will have 240 signal wires. Each signal wire will require connectors, driving and sensing circuitry, and processor time to complete the signal processing. This required large number of signal wires has limited the advantages of conventional configurations. Existing technologies utilize complex signal wire arrangements to drive and sense non-conductive inputs to capacitive touch panels. The complexity results in increased power usage, and increased engineering, manufacturing, repair, and replacement costs. Accordingly, improved systems and methods are needed in the art.

SUMMARY OF INVENTION

The present invention pertains to improved systems for sensing both conductive and non-conductive objects using a capacitive touch panel. Specifically, designs described herein implement electrode arrangements for a capacitive touch panel with a reduced number of signal wires and improved driving schemes. The reduced number of signal wires produce electrode arrangements with unexpected accuracy and performance while simplifying the design and manufacture of capacitive touch panels.

Each pair of similarly shaped triangle electrode elements (i.e., the halves of the bow tie and hourglass shapes) are electrically connected at their respective common apex as in conventional configurations such as described with respect to FIG. 3. In embodiments of the present invention, in contrast to conventional configurations, rows and columns are not symmetric in that each row has a single group of drive elements (hourglass shape) that is connected differently from drive elements of an adjacent row, and a single drive line. In addition, each column has two groups of sensor elements (bow tie shape) that alternate and two sense lines. The sense and drive portions, including electrodes and related interconnections, may be in different parallel planes (parallel to the page of the figures), separated by an insulating layer. Sense and drive portions may be swapped in function (i.e. two drives portions and one sense portion) simply by reversing the driving signals. With such configuration, if there are M rows and N columns, then there are only M+2N signal wires, which is reduced as compared to conventional configurations as detailed above. The signal line reduction may be maximized by choosing the appropriate orientation of the design to make M>N.

An aspect of the invention, therefore, is a capacitive touch panel that requires a reduced number of signal wires as compared to conventional configurations. In exemplary embodiments, the capacitive touch panel includes a substrate; a first drive line disposed on the substrate; a first sense line disposed on the substrate; a second sense line disposed on the substrate; a first plurality of electrode elements disposed on the substrate, wherein each electrode element of the first plurality of electrode elements is coupled to the first drive line, and wherein the first plurality of electrode elements includes a first drive element; a second plurality of electrode elements disposed on the substrate, wherein each electrode element of the second plurality of electrode elements is coupled to the first sense line, and wherein the second plurality of electrode elements includes a first sense element disposed adjacent to the drive element; and a third plurality of electrode elements disposed on the substrate, wherein each electrode element of the third plurality of electrode elements is coupled to the second sense line, and wherein the third plurality of sensor elements includes a second sense element disposed in a nearest neighbor position relative to the first drive element.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

FIG. 8 is a schematic drawing depicting an electronic device with a capacitive touch panel configured to detect a touch input in accordance with embodiments of the present invention.

DETAILED DESCRIPTION OF EMBODIMENTS

Figure 2:
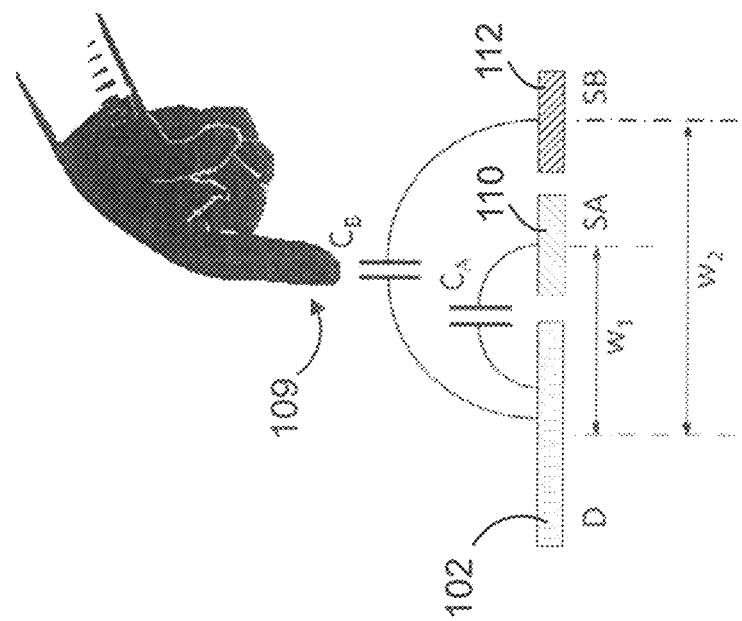
FIG. 2 is a schematic drawing depicting a touch panel configured to detect non-conductive objects.
Figure 1:
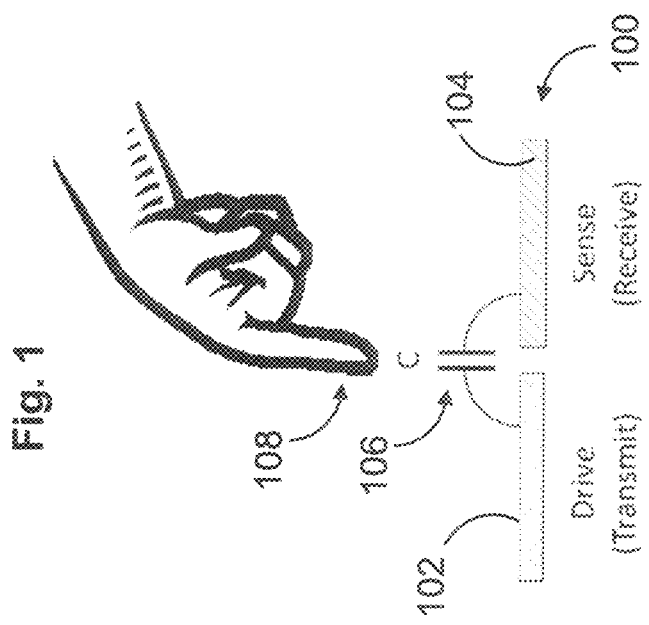
FIG. 1 is a schematic drawing depicting a conventional capacitive touch panel.

Embodiments of the present invention will now be described with reference to the drawings, wherein like reference numerals are used to refer to like elements throughout. It will be understood that the figures are not necessarily to scale.

An aspect of the invention is an improved capacitive touch panel that implements a simplified electrode arrangement that reduces the total number of signal wires. In exemplary embodiments, the reduced number of signal wires improves performance of the capacitive touch panel by reducing the number of connectors, reducing the amount and complexity of driving and sensing circuitry, and simplifying the signal processing required to detect a touch input.

In exemplary embodiments, the capacitive touch panel includes a substrate; a first drive line disposed on the substrate; a first sense line disposed on the substrate; a second sense line disposed on the substrate; a first plurality of electrode elements disposed on the substrate, wherein each electrode element of the first plurality of electrode elements is coupled to the first drive line, and wherein the first plurality of electrode elements includes a first drive element; a second plurality of electrode elements disposed on the substrate, wherein each electrode element of the second plurality of electrode elements is coupled to the first sense line, and wherein the second plurality of electrode elements includes a first sense element disposed adjacent to the drive element; and a third plurality of electrode elements disposed on the substrate, wherein each electrode element of the third plurality of electrode elements is coupled to the second sense line, and wherein the third plurality of sensor elements includes a second sense element disposed in a nearest neighbor position relative to the first drive element.

Figure 4:
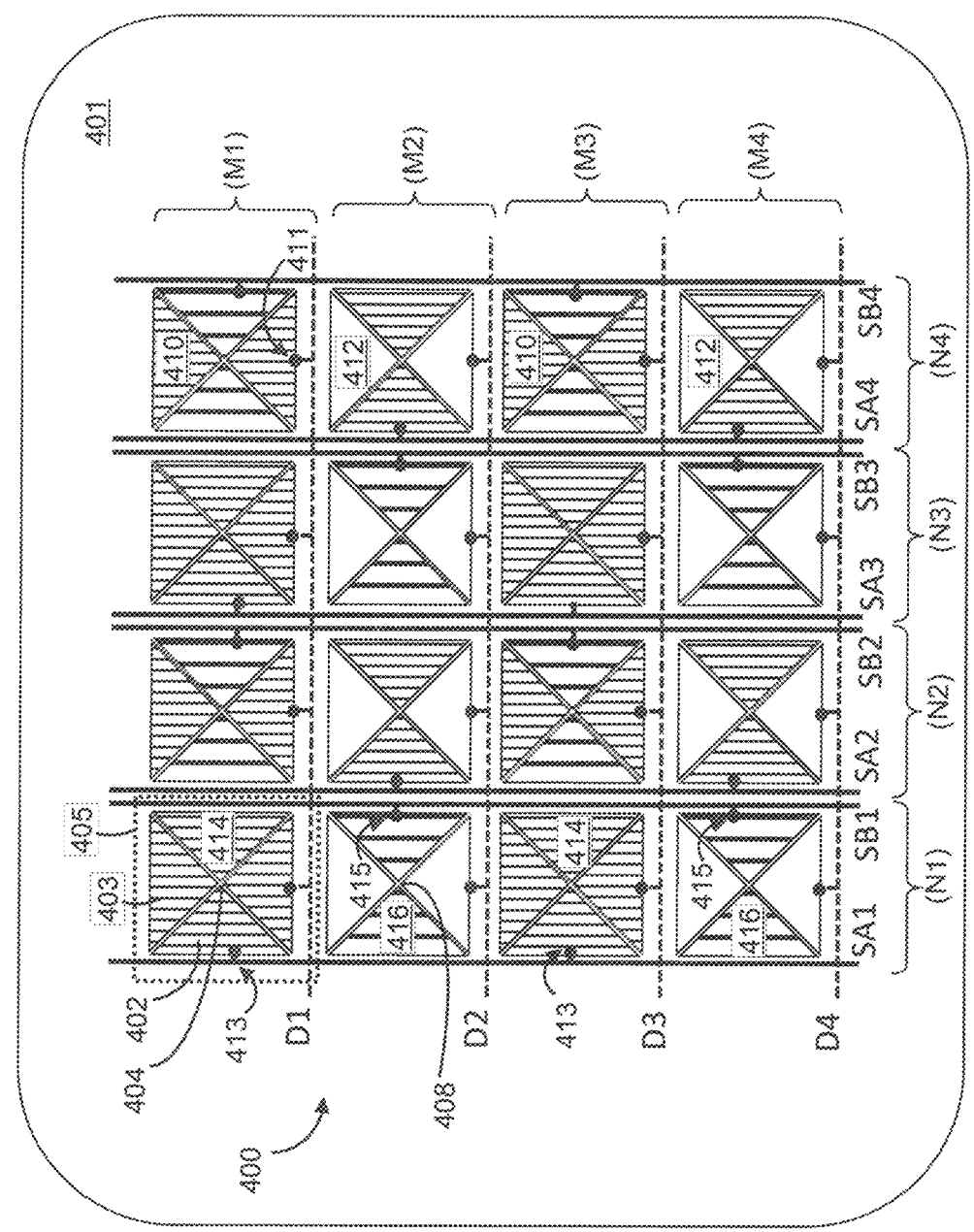
FIG. 4 is a plan view of a capacitive touch electrode arrangement in accordance with embodiments of the present invention.

FIG. 4 is a plan view of a capacitive touch electrode arrangement 400 in accordance with embodiments of the present invention. The capacitive touch electrode arrangement 400 may be formed on a substrate 401. The substrate 401 may include any suitable insulating material such as a transparent insulating material like glass, plastic, etc. or a non-transparent insulating material. The electrode arrangement 400 includes a plurality of drive electrode rows, M (e.g., four rows M1, M2, M3, and M4 are shown), and a plurality of sense electrode columns, N (e.g., four columns N1, N2, N3, and N4 are shown). This configuration may be referred to as a "forward" detection scheme in that all rows are configured as driving arrangements and all columns are configured as sensing arrangements. Alternatively, driving and sensing circuitry may be coupled to rows M and columns N such that one or more drive electrode rows, M, may be configured as a sense arrangement and one or more sense electrode columns, N, may be configured as a drive arrangement, which is referred to as a "reverse" detection scheme. In some embodiments, circuitry may be able to configure electrode rows M and electrode columns N in either a "forward" detection scheme or a "reverse" detection scheme. For ease of explanation, horizontal electrode rows, M, will be referred to as drive electrode rows and vertical electrode columns, N, will be referred to as sense electrode columns.

The electrode arrangement 400 includes a first set of electrode elements 402 configured as bow-tie electrode elements, and a second set of electrode elements 403 configured as hourglass electrode elements. As described in connection with FIG. 3, each triangular side of the one or more bow-tie electrodes 402 is electrically connected at an apex 404, and each triangular side of the one or more hourglass electrodes 403 is electrically connected at an apex 408. The connection between the one or more bow-tie electrodes 402 is electrically separated by an insulating layer from the connection between the one or more hourglass electrodes 403. Each intersection of a row, M, and a column, N, may be referred to as an electrode pair 405 including a bow-tie electrode 402 and an hourglass electrode 403. In one example, linear dimensions of an electrode pair may in a range of 1 mm-10 mm depending on the electrode shapes, and thickness and relative dielectric constant of the cover glass or other cover layer. Cover glass can be typically 0.1 mm-3 mm thick, and relative dielectric constants typically are in the range of 3-4 depending on the cover material which may be glass as referenced, or another suitable insulator material. The described dimensions may be varied as warranted for any particular application and material combination.

Figure 3:
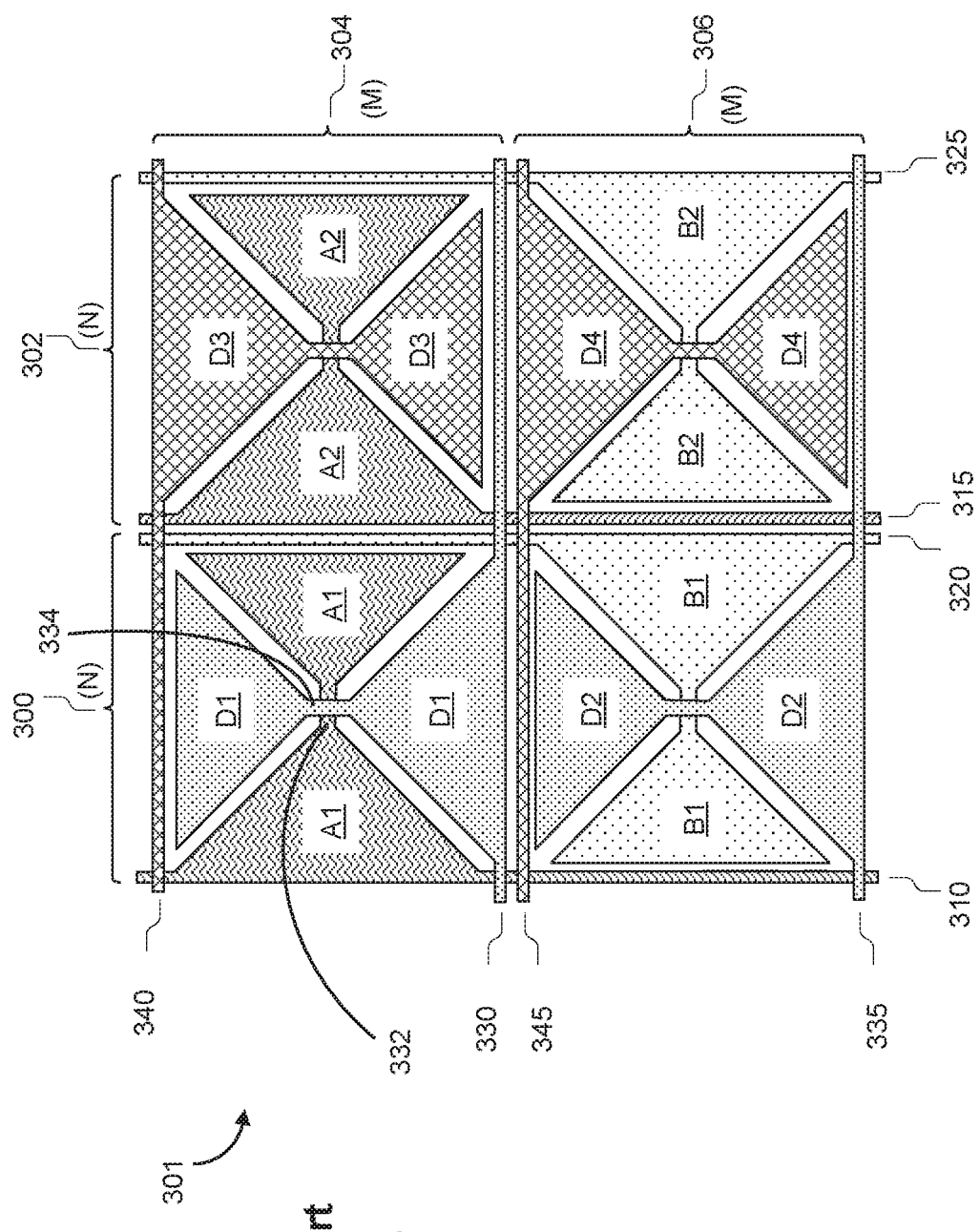
FIG. 3 is a plan view of an electrode arrangement of a conventional capacitive touch panel.

Unlike conventional capacitive touch panels, the arrangement of drive electrodes and sense electrodes in FIG. 4 is not symmetric like the electrodes shown in FIG. 3. For illustration, different groups of electrode elements are illustrated using different patterning in FIG. 4 (and likewise in subsequent figures). For example, as shown in FIG. 4 each drive electrode row, M, has a single group of electrode elements of the second set of electrode elements 403 (as illustrated in the patterning of the hourglass shapes). The first drive electrode row M1 is coupled to a first drive line D1 and includes a first group of electrode elements 410. Each electrode element 410 is coupled at a node 411 to drive line D1. The second drive electrode row M2 is coupled to a second drive line D2 and includes a second group of electrode elements 412 connected to the second drive line D2. The third drive electrode row M3 is coupled to a third drive line D3 and includes the first group of electrode elements 410 connected to the third drive line D3, and the fourth drive electrode row M4 is coupled to a fourth drive line D4 and includes the second group of electrode elements 412 connected to the fourth drive line D4. In this manner, each row M is associated with a single group of a plurality of hourglass electrode elements, and hourglass electrode elements in adjacent rows are different groups.

Further as to the exemplary embodiment of FIG. 4, each sense electrode column, N, has two groups of electrode elements of the first set of electrode elements 402 (as illustrated in the patterning of the bow-tie shapes) and two sense lines. For example, the first sense electrode column N1 has a first sense line SA1 and a second sense line SB1. The first sense line SA1 and the second sense line SB1 may be coupled to alternating electrode elements of the first set of electrode elements 402. Accordingly, the first sense line SA1 is coupled at a node 413 to a third group of electrode elements 414, and the second sense line SB1 is coupled at a node 415 to a fourth group of electrode elements 416. The other sense electrode columns N are configured comparably, but with the bow-tie electrode elements alternating on both a row and column basis. For the second sense electrode column line N2, the first sense line SA2 is coupled to third group electrode elements 414, and the second sense line SB2 is coupled to fourth group electrode elements 416. For the third sense electrode column line N3, the first sense line SA3 is coupled to third group electrode elements 414, and the second sense line SB3 is coupled to fourth group electrode elements 416. For the fourth sense electrode column line N4, the first sense line SA4 is coupled to third group electrode elements 414, and the second sense line SB4 is coupled to fourth group electrode elements 416.

As referenced above, the hourglass electrodes are commonly connected within a given row, and connections of different groups of hourglass electrodes to different drive lines alternate down each column. In addition, the bow-tie shape electrode connections alternate both across each row and down each column. With such configuration, the embodiment of FIG. 4 lacks the symmetry of the conventional configuration of FIG. 3, which permits reduction of the number of signal wires as further explained below.

Because signal lines D1-D4 are designated as drive lines, the first and second electrode groups 410 and 412 may be considered the drive electrodes. Commensurately, because signal lines SA1-SA4 and SB1-SB4 are designated sense lines, the third and fourth electrode groups 414 and 416 may be considered the sense electrodes. It will be appreciated that the drive and sense electrodes may be interchanged by the reversal of the signal inputs (i.e., signal lines D1-D4 may be sense lines and signal lines SA1-SA4 and SB1-SB4 may be drive lines). In some embodiments, the sense electrodes and drive electrodes may be configured in separate parallel planes (e.g., parallel to the page). One or more insulating layers may be disposed between the sense electrodes and the drive electrodes. The electrode arrangement 400 may be formed using, for example, standard photolithographic or printing techniques. The materials used for the electrode layers may be a transparent conductive material such as Indium Tin Oxide (ITO), Indium Zinc Oxide (IZO), and the like. The materials used for the one or more insulating layers may be silicon dioxide, silicon nitride, acrylic resin, and the like.

Because each row M of the electrode arrangement 400 uses a single group of electrode elements, the number of drive lines is reduced to M versus conventional arrangements in which the number of drive lines is 2M. Accordingly, the number of signal wires in embodiments of a capacitive touch panel using the electrode arrangement 400 becomes:

Total Signal Wires=$M+2N$.

Figure 5:
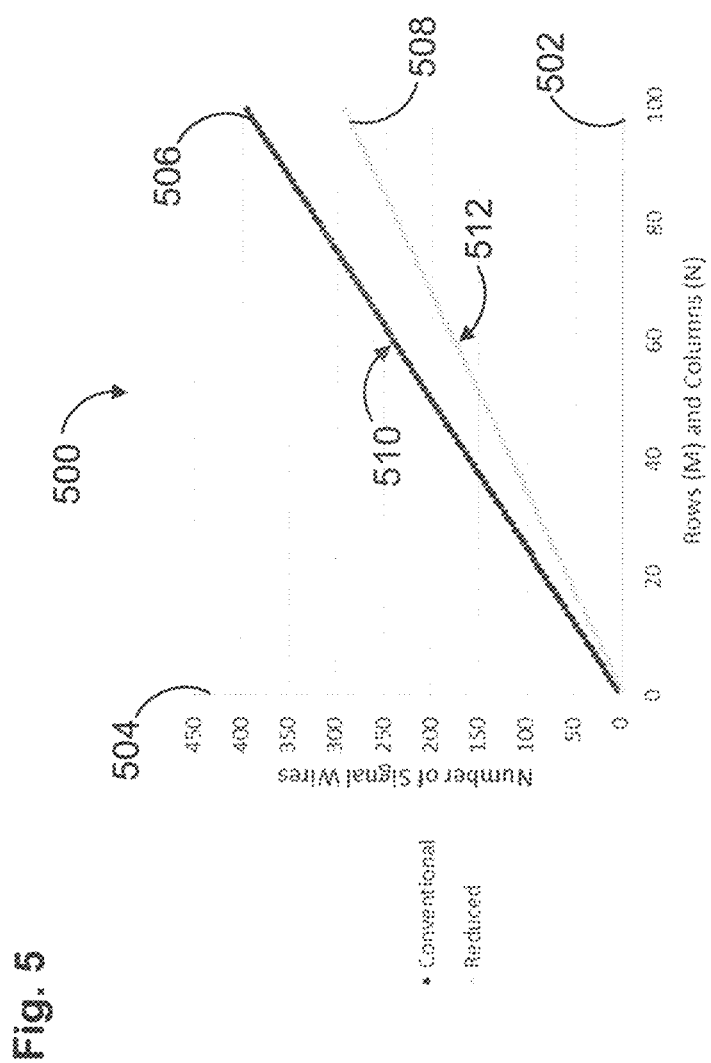
FIG. 5 is a plot showing the reduced signal wire count in improved capacitive touch panels in accordance with embodiments of the present invention versus conventional designs.

FIG. 5 is a plot 500 showing the reduced signal wire count in improved capacitive touch panels in accordance with embodiments of the present invention versus conventional designs. As discussed in connection with FIG. 4, if there are M rows and N columns of electrodes in electrode arrangement 400, then there are only $M+2N$ signal wires. To illustrate, plot 500 shows the total signal wires for a conventional electrode arrangement and an improved electrode arrangement where the number of rows is equal to the number of columns. The number of rows and columns is shown on the x-axis 502, and the total signal wires is shown on the y-axis 504. A first line 506 shows the total signal wires using a conventional electrode arrangement as depicted in FIG. 3. The second line 508 shows the total signal wires using the improved electrode arrangement as depicted in FIG. 4. As discussed above, a laptop with 60 drive electrode rows (M) and 60 sense electrode rows (N) would have 240 signal wires as shown by line 510. The improved electrode arrangement will have only 180 signal wires as shown by line 512. The reduced number of signal wires will reduce the power consumption, the number of connectors, the number and size of driving and sensing circuitry, and processor time to complete signal processing. The signal line reduction generally may be maximized by choosing the appropriate orientation of the design to make M>N. Although the plot 500 shows an arrangement where the number of rows, M, equals the number of columns, N, one of ordinary skill in the art would recognize many variations, modifications, and alternatives.

Figure 6:
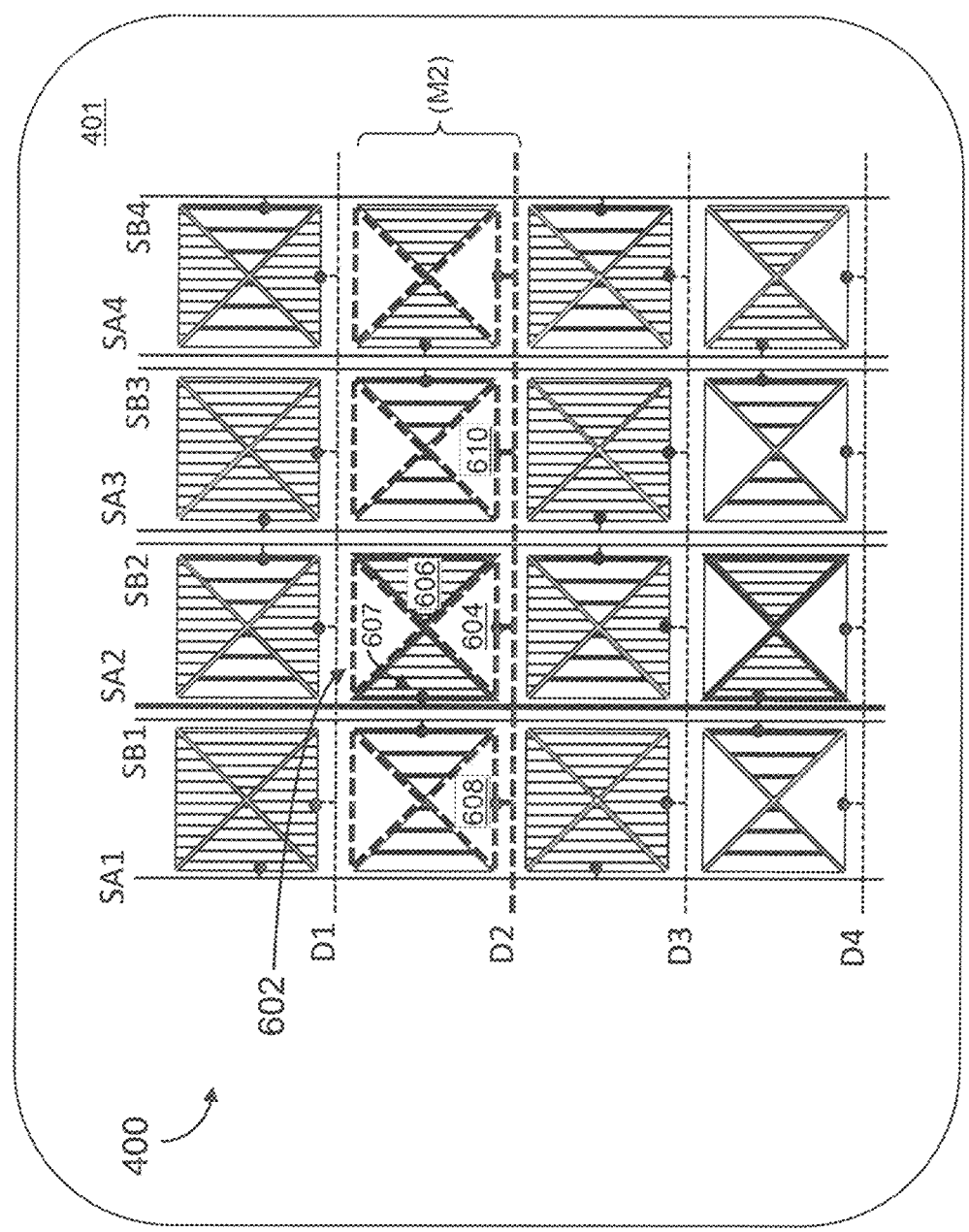
FIG. 6 is a plan view of an electrode arrangement showing a near coupling detection scheme in accordance with embodiments of the present invention.

FIG. 6 is a plan view of the electrode arrangement 400 showing a near coupling detection scheme in accordance with embodiments of the present invention. Generally, the electrode arrangement 400 may be configured for a "forward" detection scheme to detect a touch input. A signal may be driven on one or more drive lines, Dx, and a response signal may be sensed from one or more of the sense lines, SAy and SBy. In some embodiments, a response signal for each of the one or more sense lines SAy and SBy may be sensed simultaneously. The response signal from the one or more sense lines SAy and SBy may be used to determine a capacitance between the electrode elements coupled to the one or more sense lines, and the electrode elements driven by the signal on the one or more drive lines, Dx. The capacitance may be used to detect a touch input.

In some embodiments, the electrode arrangement may be configured by the circuitry for a "reverse" detection scheme. In a "reverse" detection scheme, a signal may be driven on any one of the SAy or SBy lines and a response signal may be sensed from one or more of the drive lines, Dx. In some embodiments, the response signal may be sensed simultaneously from all of the drive lines, Dx. In the reverse detection scheme, the response signal may be processed to determine the capacitance between the electrode elements.

Advanced sampling methods may be superimposed on the sensing method described above, such as differential sensing between adjacent similar signals; multiple, simultaneous "matrix" driving using linear algebra to recover individual signals; and/or alternating "forward" detection and "reverse" detection to get better information at edges and corners. One of ordinary skill in the art would recognize many variations, modifications, and alternatives of sampling methods.

The electrode arrangement 400 may be configured to determine a near coupling capacitance and a far coupling capacitance. FIG. 6 illustrates detection of a touch input at intersection 602 using driving line D2 and sense line SA2 to detect capacitance changes at near coupling distances. For illustration, the drive lines and associated electrode elements associated with this driving scheme are indicated by darkened or dashed outlining. A near coupling capacitance, such as $C_a$ in FIG. 2, may be associated with adjacent electrode elements. In some embodiments, adjacent electrode elements may be a drive electrode element such as an hourglass electrode element 604 and a sense electrode element such as bow-tie electrode element 606. Adjacent electrode elements may be positioned such that there are no device structures, aside from one or more insulating layers, disposed between the two electrode elements, and thus may correspond to an electrode pair 405 as identified in FIG. 4. The near coupling capacitance between electrode element 604 and electrode element 606 may decrease when a touch input is associated with a non-conductive object. Near coupling distances can be associated with a predetermined distance such as a distance between adjacent element elements. The near coupling distance may be determined using at least one or more of the shape and disposition of the electrode elements, the scale and the thickness of the electrode elements, and a dielectric constant of any protective cover such as glass.

At intersection 602, circuitry may provide a driving signal to drive line D2 to drive electrode element 604. Here, a change in the near coupling capacitance may be determined by circuitry coupled to sensing electrode element 606 coupled at node 607 to sense line SA2. The drive signal transmitted by the driving line D2 and the driving electrode element 604 may cause a response signal such as a current and/or voltage in the sensing electrode element 606. The response signal can be detected by circuitry coupled to the sense line SA2. In conventional embodiments such as FIG. 3, adjacent electrode elements 608 and 610 would be coupled to a second drive line and driven by a second signal. Here, the entire row, M2, is driven using D2 to simplify the design and reduce the signal wire count. Unexpectedly, embodiments described herein may detect a touch input using the change in the near coupling capacitance and a change in a far coupling capacitance even with adjacent electrode elements 608 and 610 receiving the drive signal, and no loss of performance is experience by the reduction of the number of signal wires.

Figure 7:
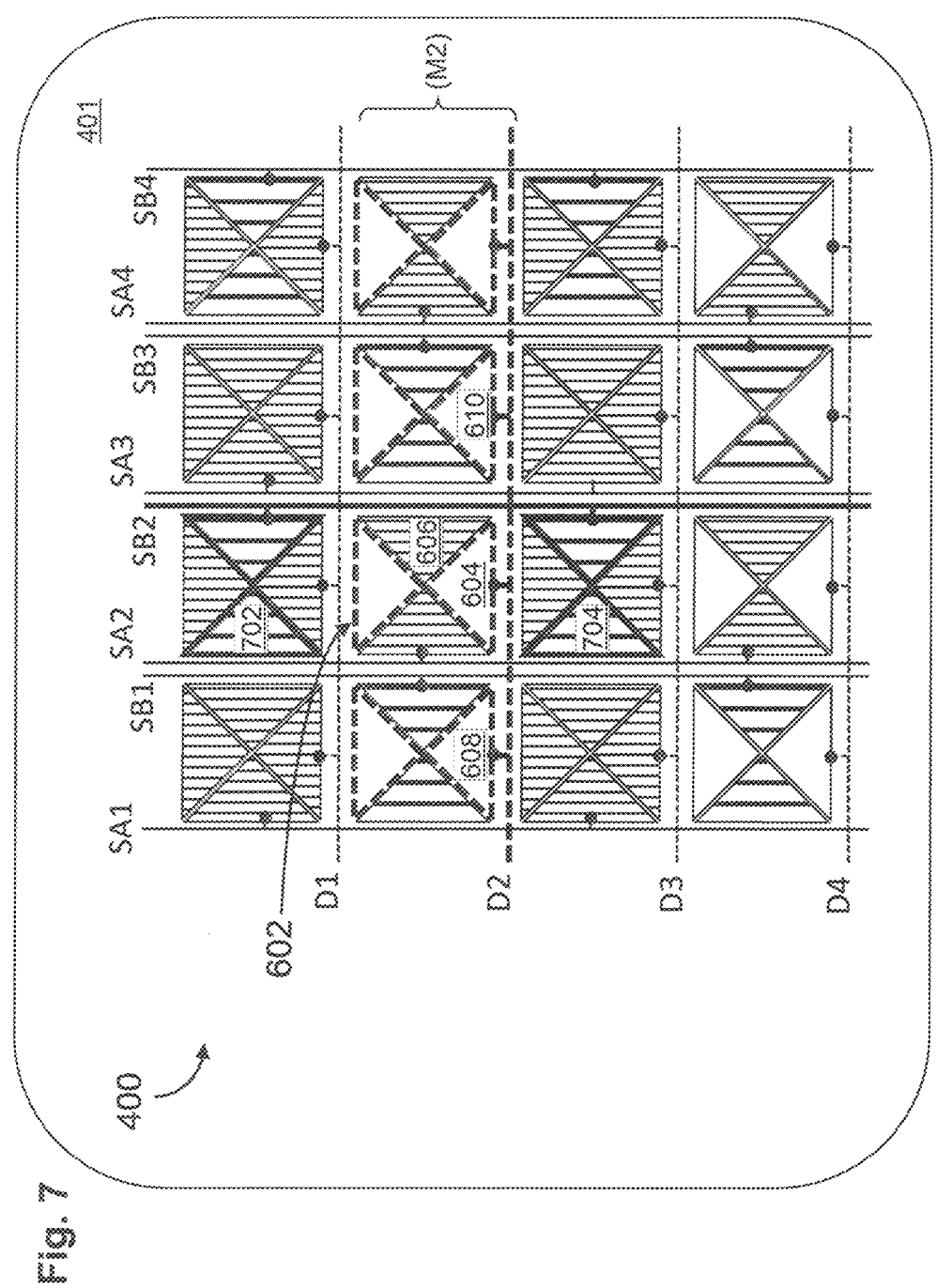
FIG. 7 is a plan view of an electrode arrangement showing a far coupling detection scheme in accordance with embodiments of the present invention.

FIG. 7 is a plan view of the electrode arrangement 400 showing a far coupling detection scheme in accordance with embodiments of the present invention. Again, for illustration the drive lines and associated electrode elements associated with this driving scheme are indicated by darkened or dashed outlining. FIG. 7 illustrates detection of a touch input at the intersection 602 using drive line D2 and sense line SB2 to detect capacitance changes at far coupling distances. Far coupling distances may be associated with a predetermined distance such as a distance between the drive electrode element 604 and one or more nearest neighbor electrode elements of intersection 602, such as electrode elements 702 and 704 in the rows adjacent to the driving electrode element 604 (i.e., nearest neighbor positioning may correspond to being in an adjacent electrode pair 405 as identified in FIG. 4). A nearest neighbor position may be positioned along an axis parallel to the sense line SB2 on one or more sides of intersection 602. On sense line SB2, the far coupling capacitance, such as $C_B$ in FIG. 2, may be associated with the electrode elements coupled to SB2, i.e., electrode element 702 and electrode element 704. The far coupling capacitance may increase when a touch input is associated with a non-conductive object. In some embodiments, a touch input detection algorithm may use far coupling distances associated with electrode elements coupled to sense lines further from the intersection 602 such as SA1, SB1, SA3, and SB3.

In operation, circuitry may provide a driving signal to the drive line D2 and the driving electrode element 604. The drive signal may cause a response signal such as a current and/or a voltage in a first nearest neighbor sensing electrode element 702 and a second nearest neighbor sensing electrode element 706. The response signal may be detected by circuitry coupled to the sense line SB2. The change in the far coupling capacitance may be determined by the circuitry coupled to the sense line SB2 using the response signal. As discussed above, in conventional embodiments adjacent electrode elements 608 and 610 are coupled to a second drive line and driven by a second signal. Here, the entire row, M2, is driven using D2 to simplify the design and reduce the signal wire count. Embodiments described herein may detect a touch input using the far coupling capacitance even with adjacent electrode elements 608 and 610 receiving the drive signal.

FIG. 8 is a schematic drawing depicting an electronic device 800 with a capacitive touch display 802 configured to detect a touch input in accordance with embodiments of the present invention. The electronic device may be any device suitable for incorporating a touch panel display, such as for example a desktop or laptop computer, tablet computing device, camera or other imagining device, mobile telephone or other mobile communication device, or the like. Electronic device 800 may include, among other elements, the electrode arrangement 400 disposed on the capacitive touch display 802, a touch driver 804 coupled to the electrode arrangement 400, a display driver 806 coupled to the capacitive touch display 802, and an electronic processor 808 coupled to the touch driver 804 and the display driver 806. The electrode arrangement 400 may be coupled to circuitry such as the touch driver 804 to detect a touch input. The touch driver 804 may include circuitry that is configured to provide a drive signal to one or more drive lines, Dx, and detect a response signal such as a current and/or a voltage on one or more sense lines SAy and SBy.

The touch driver 804 may process one or more response signals to detect a touch input. For example, to detect a non-conductive object, the touch driver 804 and/or the processor 808 may execute an algorithm that includes one or more of the following steps. First, the algorithm may include a step to determine a near coupling capacitance and a far coupling capacitance as described above with respect to FIGS. 6 and 7. In exemplary embodiments, the algorithm may include a step to determine an impedance associated with one or more capacitances and to identify the touch input as a conductive object or a non-conductive object. If the touch input is associated with a non-conductive object, the near coupling capacitance may be decreasing and the far coupling capacitance may be increasing. In some embodiments, the algorithm may determine a change in capacitance by subtracting the decreasing near coupling capacitance from the increasing far coupling capacitance. The change in capacitance may be compared to a threshold value to determine when a touch input has occurred.

In some embodiments, the touch driver 804 may be configured to operate the electrode arrangement in a "forward" detection scheme and/or a "reverse" detection scheme. In some embodiments, the touch driver may transmit data associated with the one or more response signals, the drive signal, and the like to the processor 808 for further signal processing to detect a touch input. In some embodiments, the processor 808 may transmit one or more instructions to the touch driver 804 to detect a touch input. One of ordinary skill in the art would recognize many variations, modifications, and alternatives.

In some embodiments, electronic device 800 may include a capacitive touch input area in place of the capacitive touch display 802. Electronic devices with a capacitive touch input area may include an interactive whiteboard, an input panel, industrial controls, and the like.

An aspect of the invention, therefore, is a capacitive touch panel that includes a substrate, a first drive line disposed on the substrate, a first sense line disposed on the substrate, a second sense line disposed on the substrate, a first plurality of electrode elements disposed on the substrate, wherein each electrode element of the first plurality of electrode elements is coupled to the first drive line, and wherein the first plurality of electrode elements includes a first drive element, a second plurality of electrode elements disposed on the substrate, wherein each electrode element of the second plurality of electrode elements is coupled to the first sense line, and wherein the second plurality of electrode elements includes a first sense element disposed adjacent to the drive element, and a third plurality of electrode elements disposed on the substrate, wherein each electrode element of the third plurality of electrode elements is coupled to the second sense line, and wherein the third plurality of sensor elements includes a second sense element disposed in a nearest neighbor position relative to the first drive element.

In an exemplary embodiment the capacitive touch panel includes a controller coupled to the first drive line, the first sense line, and the second sense line. The controller may be configured to provide a drive signal to the first drive line, detect a first response signal on the first sense line, detect a second response signal on the second sense line, and determine a capacitance between the first drive element and the first sense element, and between the first drive element and the second sense element based on the first and second response signals.

In an exemplary embodiment of the capacitive touch panel, each of the first plurality of electrode elements is disposed on the substrate in an hourglass configuration.

In an exemplary embodiment of the capacitive touch panel, each of the second plurality of electrode elements and the third plurality of electrode elements is disposed on the substrate in a bow-tie configuration.

In an exemplary embodiment, the capacitive touch panel may include a second drive line disposed on the substrate, and a fourth plurality of electrode elements disposed on the substrate, wherein each electrode element of the fourth plurality of electrode elements is coupled to the second drive line, and wherein the fourth plurality of electrode elements includes a second drive element.

In an exemplary embodiment of the capacitive touch panel, the second sense element is disposed adjacent to the second drive element and the first sense element is disposed in a nearest neighbor position relative to the second drive element.

In an exemplary embodiment of the capacitive touch panel, the third plurality of sense elements includes a third sense element located at a second nearest neighbor position different from the first nearest neighbor position relative to the first drive element.

In an exemplary embodiment of the capacitive touch panel, the first plurality of sensor elements, the second plurality of sensor elements, and the third plurality of sensor elements are configured to be operated in a forward detection scheme in which a drive signal is applied to the first drive line and response signals are read from the first sense line and/or the second sense line.

In an exemplary embodiment of the capacitive touch panel, the first plurality of sensor elements, the second plurality of sensor elements, and the third plurality of sensor elements further are configured to be operated in a reverse detection scheme in which a drive signal is applied to the first and/or second sense lines and a response signal is read from the first drive line.

In an exemplary embodiment of the capacitive touch panel, the electrode elements are arranged in a two-dimensional array of elements, and the drive line extends in a first direction and the first and second sense lines extend in a second direction different from the first direction.

In an exemplary embodiment of the capacitive touch panel, the first direction and the second direction are perpendicular to each other.

In an exemplary embodiment of the capacitive touch panel, the first plurality of electrode elements is positioned along the first direction.

In an exemplary embodiment, the capacitive touch panel may include a second drive line disposed on the substrate that extends in the first direction and is spaced apart from the first drive line in the second direction, and a fourth plurality of electrode elements disposed on the substrate, wherein each electrode element of the fourth plurality of electrode elements is coupled to the second drive line, and the fourth plurality of electrode elements is spaced apart from the first plurality of electrode elements in the second direction.

In an exemplary embodiment of the capacitive touch panel, the second plurality of electrode elements and the third plurality of electrode elements are positioned along both the first direction and the second direction in an alternating fashion.

In an exemplary embodiment of the capacitive touch panel, a number of array elements in the second direction exceeds a number of array elements in the first direction.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

INDUSTRIAL APPLICABILITY

Embodiments of the present invention relate to configurations of touch input devices. The electrode arrangement of the capacitive touch panel described herein may be applicable to mobile phones, smartphones, personal digital assistants (PDAs), tablet and laptop computers, televisions and monitors, industrial control systems, interactive whiteboards, and the like. Principles of the present invention in particular are applicable to touch input applications intended to receive input from both conductive and non-conductive objects.

REFERENCE SIGNS LIST

100—touch panel
102—drive electrode
104—sense electrode
106—capacitance
108—finger
109—gloved finger
110—first sense electrode
112—second sense electrode
300—first sense electrode column
301—electrode arrangement
302—second sense electrode column
304—first drive electrode row
306—second drive electrode row
310—signal wire
315—signal wire
320—signal wire
325—signal wire
330—signal wire
332—conductive line
334—second conductive line
335—signal wire
340—signal wire
345—signal wire
400—capacitive touch electrode arrangement
401—substrate
402—first set of electrode elements
403—second set of electrode elements
404—apex
405—electrode pair
408—apex
410—first group of electrode elements
411—node
412—second group of electrode elements
413—node
414—third group of electrode elements
415—node
416—fourth group of electrode elements
500—plot
502—x-axis
504—y-axis
506—first line
508—second line
510—line
512—line
602—intersection
604—hourglass electrode element
606—bow-tie electrode element
608—adjacent electrode element
610—adjacent electrode element
702—electrode element
704—electrode element
706—electrode element
800—electronic device
802—capacitive touch display
804—touch driver
806—display driver
808—electronic processor

What is claimed is:
1. A capacitive touch panel comprising:
a substrate;
a first drive line disposed on the substrate;
a first sense line disposed on the substrate; a second sense line disposed on the substrate;
a first plurality of electrode elements disposed on the substrate, wherein each electrode element of the first plurality of electrode elements is coupled to the first drive line, and wherein the first plurality of electrode elements includes a first drive element;

a second plurality of electrode elements disposed on the substrate, wherein each electrode element of the second plurality of electrode elements is coupled to the first sense line, and wherein the second plurality of electrode elements includes a first sense element disposed adjacent to the first drive element;

a third plurality of electrode elements disposed on the substrate, wherein each electrode element of the third plurality of electrode elements is coupled to the second sense line, and wherein the third plurality of electrode elements includes a second sense element disposed in a nearest neighbor position relative to the first drive element;

a second drive line disposed on the substrate; and a fourth plurality of electrode elements disposed on the substrate, wherein each electrode element of the fourth plurality of electrode elements is coupled to the second drive line, and wherein the fourth plurality of electrode elements includes a second drive element;

wherein the second sense element is disposed adjacent to the second drive element and the first sense element is disposed in a nearest neighbor position relative to the second drive element.

2. The capacitive touch panel of claim 1 further comprising a controller coupled to the first drive line, the first sense line, and the second sense line, wherein the controller is configured to:

provide a drive signal to the first drive line;

detect a first response signal on the first sense line;

detect a second response signal on the second sense line; and determine a capacitance between the first drive element and the first sense element, and between the first drive element and the second sense element based on the first and second response signals.

3. The capacitive touch panel of claim 1 wherein each of the first plurality of electrode elements is disposed on the substrate in an hourglass configuration.

4. The capacitive touch panel of claim 1 wherein each of the second plurality of electrode elements and the third plurality of electrode elements is disposed on the substrate in a bow-tie configuration.

5. The capacitive touch panel of claim 1, wherein the third plurality of sense elements includes a third sense element located at a second nearest neighbor position different from the first nearest neighbor position relative to the first drive element.

6. The capacitive touch panel of claim 1 wherein the first plurality of sensor elements, the second plurality of sensor elements, and the third plurality of sensor elements are configured to be operated in a forward detection scheme in which a drive signal is applied to the first drive line and response signals are read from the first sense line and/or the second sense line.

7. The capacitive touch panel of claim 1 wherein the first plurality of sensor elements, the second plurality of sensor elements, and the third plurality of sensor elements further are configured to be operated in a reverse detection scheme in which a drive signal is applied to the first and/or second sense lines and a response signal is read from the first drive line.

8. A capacitive touch panel comprising:

a substrate;

a first drive line disposed on the substrate;

a first sense line disposed on the substrate;

a second sense line disposed on the substrate;

a first plurality of electrode elements disposed on the substrate, wherein each electrode element of the first plurality of electrode elements is coupled to the first drive line, and wherein the first plurality of electrode elements includes a first drive element;

a second plurality of electrode elements disposed on the substrate, wherein each electrode element of the second plurality of electrode elements is coupled to the first sense line, and wherein the second plurality of electrode elements includes a first sense element disposed adjacent to the first drive element; and a third plurality of electrode elements disposed on the substrate, wherein each electrode element of the third plurality of electrode elements is coupled to the second sense line, and wherein the third plurality of electrode elements includes a second sense element disposed in a nearest neighbor position relative to the first drive element;

wherein the electrode elements are arranged in a two-dimensional array of elements, and the drive line extends in a first direction and the first and second sense lines extend in a second direction different from the first direction; and wherein the second plurality of electrode elements and the third plurality of electrode elements are positioned along both the first direction and the second direction in an alternating fashion.

9. The capacitive touch panel of claim 8, wherein the first direction and the second direction are perpendicular to each other.

10. The capacitive touch panel of claim 8, wherein a number of array elements in the second direction exceeds a number of array elements in the first direction.

11. The capacitive touch panel of claim 8, wherein the first plurality of electrode elements is positioned along the first direction.

12. The capacitive touch panel of claim 11 further comprising:

a second drive line disposed on the substrate that extends in the first direction and is spaced apart from the first drive line in the second direction; and a fourth plurality of electrode elements disposed on the substrate, wherein each electrode element of the fourth plurality of electrode elements is coupled to the second drive line, and the fourth plurality of electrode elements is spaced apart from the first plurality of electrode elements in the second direction.

* * * * *